J. F. WILLIAMS.
RAIL JOINT NUT LOCK AND GUARD.
APPLICATION FILED OCT. 31, 1919.
1,357,370.
Patented Nov. 2, 1920.
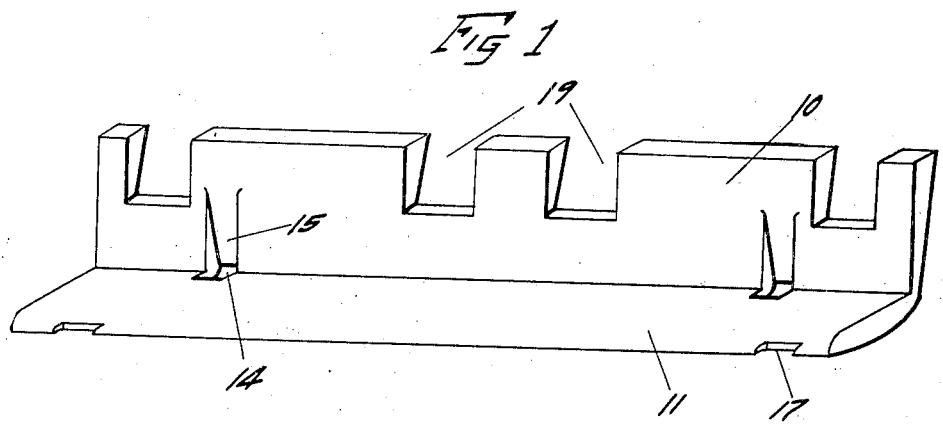
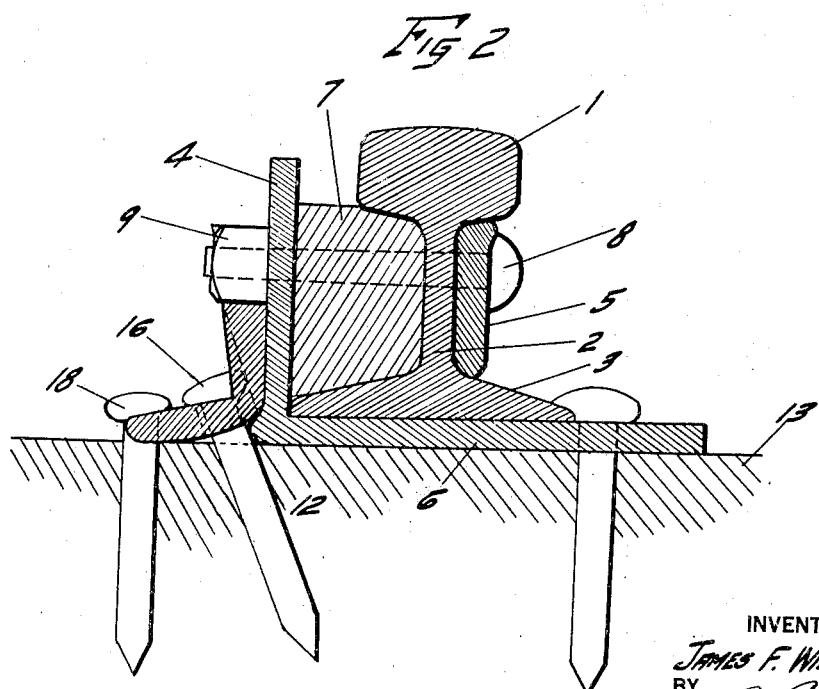
INVENTOR
James F. Williams.
BY
ATTORNEY

UNITED STATES PATENT OFFICE.

JAMES F. WILLIAMS, OF BIRMINGHAM, ALABAMA.

RAIL-JOINT NUT-LOCK AND GUARD.

1,357,370.   Specification of Letters Patent.   Patented Nov. 2, 1920.

Application filed October 31, 1919. Serial No. 334,670.

*To all whom it may concern:*

Be it known that I, JAMES F. WILLIAMS, a citizen of the United States of America, residing at Birmingham, in the county of Jefferson and State of Alabama, have invented certain new and useful Improvements in Rail-Joint Nut-Locks and Guards, of which the following is a specification.

My invention relates to a novel type of nut lock and guard plate which is especially adapted for use as a safety appliance for railway track joints to both lock and guard the bolts connecting the rail ends and fish plates against working loose or being sheared by the flanges of derailed wheels.

More particularly it is my purpose to design a plate adapted to fit snugly against and brace the fish plates to be spiked to the outer cross tie by spikes, some engaging the outer edge of its base and some passing through holes in the base to secure the rail flange to the cross ties. The top of the plate is wedge shaped and notched to receive all of the nuts provided at a track joint, its upper edge being thick enough to house the nuts which lie flush therewith so that it forms a guard over which derailed wheel flanges will ride without shearing the nuts or bolts and thereby opening the track joint.

My invention comprises the novel details of construction and arrangements of parts, which in their preferred embodiment only are illustrated in the accompanying drawings which form a part of this specification, and in which:—

Figure 1 presents in perspective view one of my nut lock and guard plates.

Fig. 2 is a transverse cross sectional view through a rail joint showing the nut lock and guard plates in operative position.

Similar reference numerals refer to similar parts throughout the drawings.

I have illustrated my invention in connection with a standard type of rail having a head 1 connected by a web 2 with the base 3. The meeting ends of such rails are shown connected by standard fish plates 4 and 5, the former having a base 6 extending under the rail and having a wooden filler block 7 between it and the rail. The fish plates and rail ends are connected by the usual track bolts 8 having nuts 9 screwed on the threaded ends. Any other standard type of fish plate may be used.

The object of my invention is to protect nuts and bolts from being sheared and to lock the nuts against working loose. To this end I provide a plate shown in its preferred embodiment in Fig. 1 and comprising a vertical member 10 integral with a base flange 11. The inside face of the member 10 is shaped to snugly engage the outer face of the fish plate 4 while the base 11 is shaped to rest solidly on the flange 12 along the bottom edge of the fish plate 4 and upon cross ties 13. In the base flange 11 I provide a plurality of spike holes 14 disposed at the base of an upwardly tapering slot 15 in the outer face of the member 10 and these spike holes are adapted to permit the spikes 16 to be driven in so as to hold down the fish plate. The outer edge of the base flange 11 is notched at 17 to receive the spikes 18 utilized to brace and anchor the plate firmly in position against the fish plates. It will be observed that the outer face of the member 10 slopes upwardly and outwardly so as to give this member a pronounced wedge shape in cross section, the top of the wedge having a width approximately equal to the thickness of the nut 9. In the top of the member 10 I provide a series of notches 19 which open overhead and disposed each to receive and snugly house one of the nuts 9 so as to support it underneath and hold it against rotation, thereby serving as a nut lock and at the same time guarding the nut overhead from being struck by the flange of a derailed wheel and sheared. The tops of the nuts come flush with the top edge of the plate which is thus practically made continuous.

In operation, the rail joints are spliced in the customary manner but without driving the track spikes 16. After the joint has been bolted up my improved nut lock and guard plate is applied in the manner described and held in position by the spikes 16 and 18 which firmly anchor the plates in position.

This invention is not intended to be restricted in scope to the specific embodiments shown, but contemplates such modifications as come within the spirit and scope of the claims.

What I claim as new and desire to secure by Letters Patent, is:—

1. A nut lock and guard plate for rail joints comprising a vertical member adapted to fit snugly against the side of a fish plate and having notches in its upper portion to receive the track joint nuts, the upper edge of said portion being thick enough to house and completely guard the nuts from being sheared or injured by derailed wheels, and a base member adapted to rest on the track support and to be spiked thereto.

2. A nut lock and guard plate for rail joints comprising an angle metallic member provided with an upright portion tapering from top to line of junction with the base portion, there being spiking apertures through the base portion and notches along the top edge forming nut seats the top of the upright member being thick enough to come at least flush with the outermost ends of the nuts and the notches being deep enough to permit the nuts to set therein free of projecting parts above said top edge of the plate.

3. In a rail joint the combination with the meeting ends of a pair of rails supports therefor fish plates engaging the opposite sides of the rails and nut and bolt fastenings to connect the rails and fish plates, of a guard plate having a downwardly tapering upright portion with top notches to receive and house the nuts, said upright portion having its inner face adapted to fit snugly against and to seat on a fish plate, the upper edge of said taper portion having the necessary thickness to project beyond the nuts, and the notches being deep enough to adapt the top edge of the guard plate to protect the top edges of the nuts from injury from a derailed wheel flange, and said guard plate having a base adapted to rest upon the rail supports, there being notches in said base to receive spikes adjacent to the fish plate and spikes adjacent to the outer edge of the guard plate base, substantially as described.

In testimony whereof I affix my signature.

JAMES F. WILLIAMS.

Witness:
NOMIE WELSH.